March 2, 1971  W. E. STULTS  3,567,221
BALANCING GAME AND TEACHING AID
Filed May 2, 1968  2 Sheets-Sheet 1

Inventor
WILLIAM E. STULTS
by JEFFERS & YOUNG
Attorneys

March 2, 1971     W. E. STULTS     3,567,221
BALANCING GAME AND TEACHING AID
Filed May 2, 1968     2 Sheets-Sheet 2
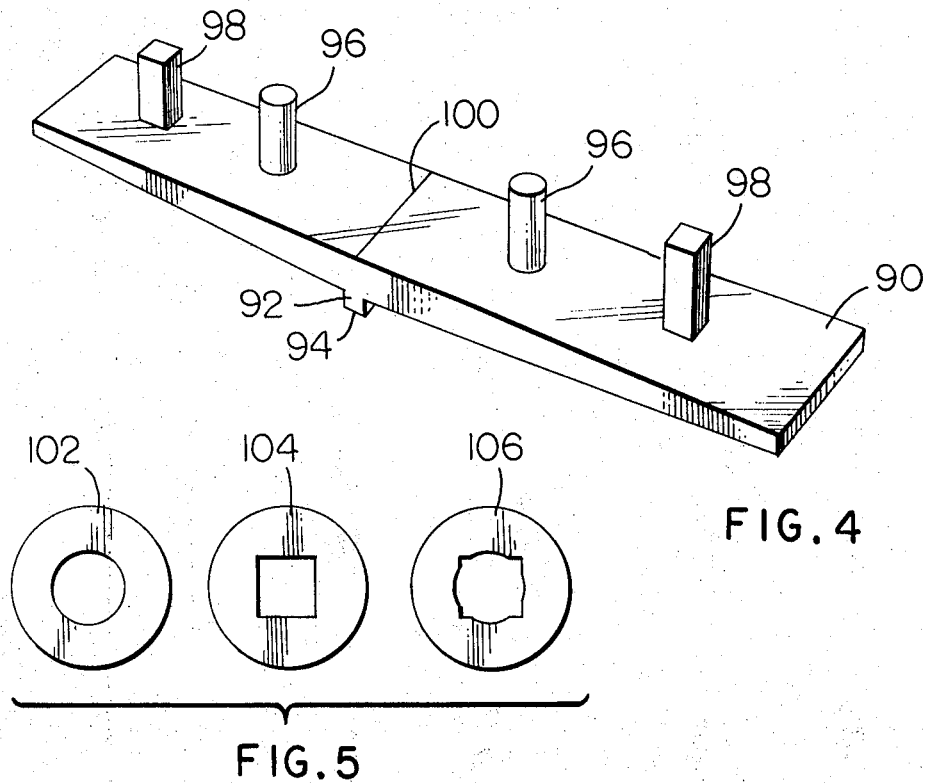
FIG. 4
FIG. 5
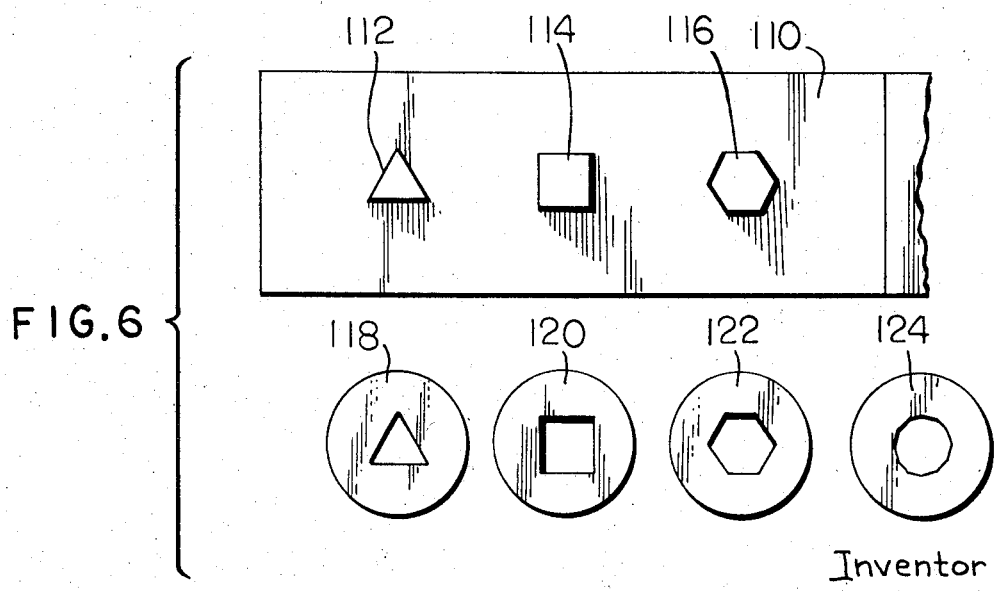
FIG. 6
Inventor
WILLIAM E. STULTS
by JEFFERS & YOUNG
Attorneys United States Patent Office 3,567,221
Patented Mar. 2, 1971

3,567,221
BALANCING GAME AND TEACHING AID
William Emerson Stults, Fort Wayne, Ind., assignor to Sargent-Welch Scientific Company, Skokie, Ill.
Filed May 2, 1968, Ser. No. 726,151
Int. Cl. A63f 9/00; G09b 19/02
U.S. Cl. 273—1
12 Claims

ABSTRACT OF THE DISCLOSURE

The invention concerns a balance bar having a fulcrum on the bottom which will support the bar in a horizontal position when it is loaded evenly on opposite sides of the center line. The bar has a plurality of pins extending upwardly from the top surface and spaced evenly from each other and from the center of the bar. Weight elements are receivable on the pins to form the means for playing a game and also for demonstrating arithmetical and physical principles. Each of the pins on each side of the fulcrum point is either a respective color or shape, and the weight elements include at least one of each such color or shape.

---

This invention relates to a game device and teaching device and is particularly concerned with a device of the aforementioned nature in which the principles of arithmetic and levers and the like can be demonstrated simultaneously with playing of the game.

The invention, in brief, comprises a balanced bar having a fulcrum member integral therewith on the lower side and having on the upper side a plurality of pins arranged in longitudinally distributed manner on opposite sides of the center of the bar. A plurality of unit weight members are provided which can be placed on and removed from the pins. The pins may be identified by respective colors and, similarly, the weights can be identified by colors, if so desired.

The described device can be employed as a game following certain designated rules and, also, the device can be employed as a teaching device by means of which a student can gain realization of basic arithmetical functions and relationships and can also gain knowledge of simple lever action.

With the foregoing in mind, a particular object of the present invention is the provision of a game device, which can also serve as a teaching device, in which game device presents a challenge to the players as well as demonstrating arithmetical and physical principles.

A still further object is a provision of a game device particularly adapted for use by two players and which device can also be used by one or more students to gain insight into arithmetical principles and which device can also be used by an instructor to demonstrate arithmetical principles.

The foregoing objects of the present invention as well as other objects and advantages thereof will become more apparent upon reference to the following detailed specification taken in connection with the accompanying drawings in which:

FIG. 4 is a view like FIGS. 1 and 2 showing a modification;

FIG. 5 is a view showing weight elements for use with the modification of FIG. 4; and FIG. 6 is a partial view of still another modification and weight elements for use therewith.

Figure 1:
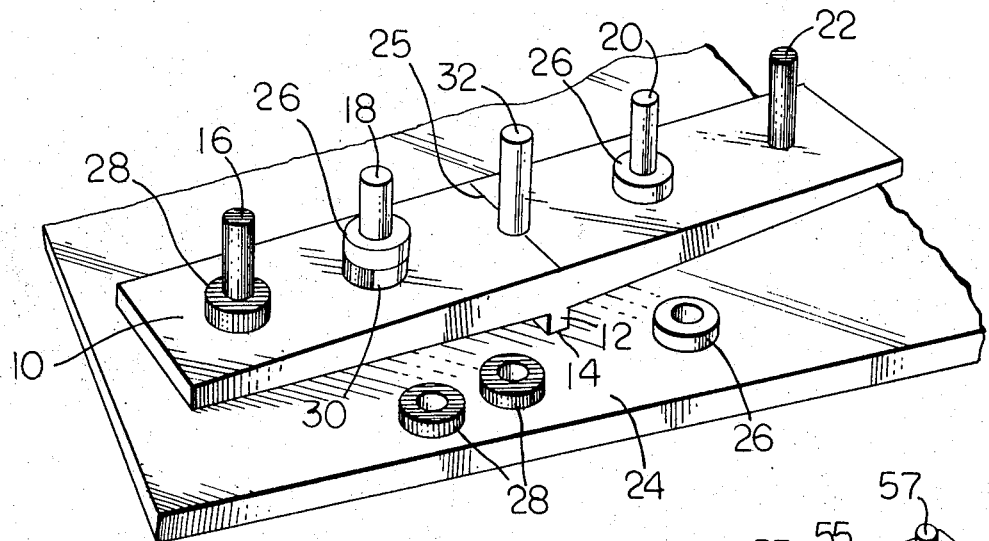
FIG. 1 is a perspective view showing one form which a device according to the present invention can take.

Referring to the drawings somewhat more in detail, FIG. 1 shows one form of the present invention. The device comprises an elongated member 10 having on the bottom thereof in the center a dependent fulcrum member 12 which, as will be seen, has a flat bottom region 14. Extending upwardly from the upper side of bar 10 are pins 16, 18, 20, and 22. Pins 18 and 20 are equally spaced on the bar on opposite sides of center line 25 of the bar and which center line is disposed vertically over the center of fulcrum member 12.

Pins 16 and 22 are also equally spaced on opposite sides of center line 25 while, furthermore, the distance from center line 25 to the center of either of pins 18 or 20 is exactly the same as the distance between the center line of pins 18, 20 and center line of the respective pins 16, 22. As shown in the drawings, pins 16 and 22 may be of one color and pins 18 and 20 may be of another color.

A plurality of weight rings is provided, some of which are shown mounted on pins 16, 18, and 20 and others of which are shown resting on the table top 24 on which the bar is resting. These rings include rings 26 which are the same color as pins 18 and 20, rings 28 which are the same color as pins 16 and 22, and one or more rings 30 having a different color coding thereon.

In playing a game, each of two players decide on a certain number and combination of rings or weights to be employed in playing the game. The first player then arranges all of the weights on the balanced bar in any unbalanced position so that the bar tilts in one direction or the other. In FIG. 1, for example, the bar is tilted downwardly at its left end.

The second player then takes one weight from any pin and puts it on a different pin or places it in front of him on the table which will then constitute his hand. The player's hand consists of the weights which he has removed from the bar and these weights must remain in view before him at all times.

Following the play by the second player, the first player makes his play in the same manner and this then continues to the end of the game.

A play, in brief, consists of taking one ring or weight from a pin on the bar and putting it on another pin on the bar or in the players hand, or consists of taking one or all of the rings or weights from a player's hand and placing them on the pins of the bar. The rings or weights are always placed on pins of the corresponding color except the individually color coded ring or weight 30 which is considered to be a wild weight and can be placed on any of the pins.

The game is won when the bar is balanced, or when a player makes a futile attempt to balance the bar by putting more than one weight ring on the bar.

A game is won when a player balances the bar with no more weight rings remaining in his hand, or when the opponent balances the bar by mistake while one or more weight rings remains in his hand.

Certain rules are observed which can, of course, vary substantially, but one variation requires that the wild weight ring remains on the bar at all times. It can be moved from pin to pin but it cannot be removed from the bar and placed in a player's hand.

The bar may tip from one side to the other, i.e. from being off balance on one side to being off balance on the other side on any play but the game can only be won in the aforesaid manner by bringing the bar deliberately into balance with no weight rings remaining in the player's hand.

As a variation of the game, and also as a teaching adjunct, another pin 32 can be provided at the center of the bar. In the game, pin 32 provides a receiver for rings which would be different from the other pins in effect while, for teaching, pin 32 demonstrates a zero condition.

Figure 2:
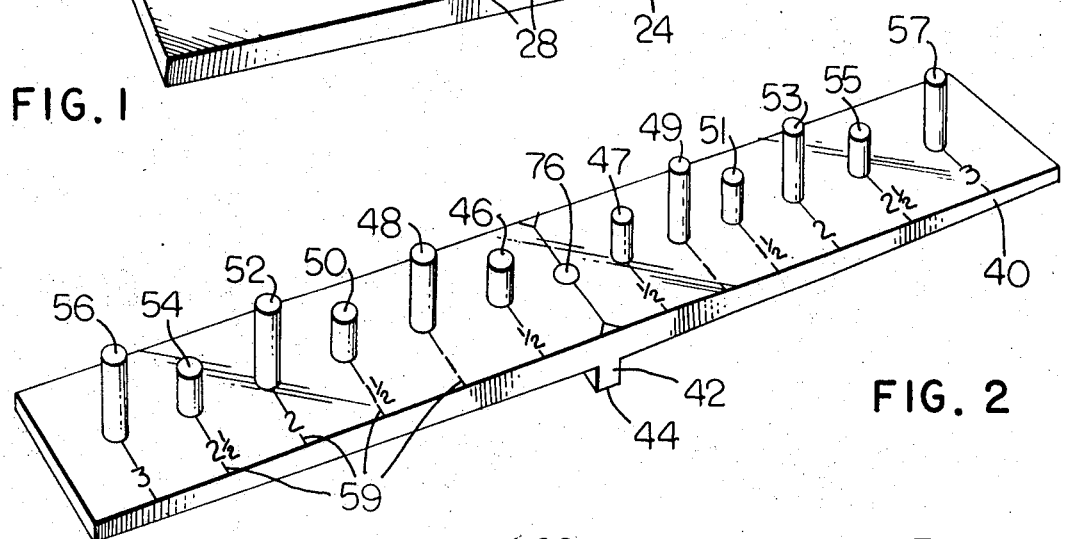
FIG. 2 is a perspective view similar to FIG. 1 but showing another modification of the invention.

In FIG. 2, bar 40 has a fulcrum portion 42 on the bottom in the center and which fulcrum portion has a flat bearing surface 44 so the bar will tilt about the edges of surface 44 and thus have a stable horizontal position. The smallest weight used, however, at the shortest distance from the center of the bar will tilt the bar from its balanced position.

Bar 40 has pins 46, 48, 50, 52, 54, and 56 arranged at equal intervals along the bar on one side of the center and pins 47, 49, 51, 53, 55, and 57 similarly arranged along the bar on the other side of the center of the bar.

Pins 46, 50, 54, 47, 51, and 55, represent half distances and are shorter than the other pins.

Transverse index marks 59 in the planes of the center lines of the pins marked on the bar and bear indicia corresponding to the distance of the perspective pin from the center of the bar.

Figure 3:
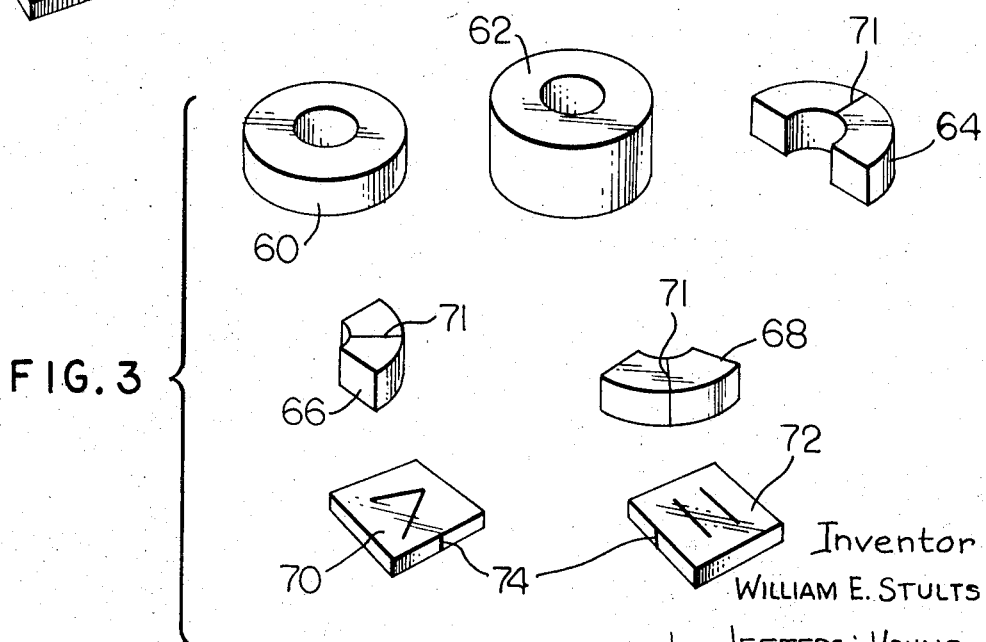
FIG. 3 is a view showing weight members and relation indicating members for use with the device of FIG. 2.

FIG. 3 shows the weight elements employed with the FIG. 2 modification. The weight elements are in the form of ring means which are complete rings or partial rings. For instance, 60 shows a complete ring representing one unit; 62 is a complete ring representing two units. The ring part at 64 is ½ unit; the ring part at 66 is ¼ unit; and the ring part at 68 is ⅓ unit.

The part rings all have a mark 71 thereon in the place of the center of gravity so that when a ring part is placed against a pin with the mark 71 in registration with the respective index mark 59, the center of gravity of the ring part will be in the transverse plane of the center line of the respective pin.

FIG. 3 also shows markers 70 and 72 which bear symbols of "greater than" and "equal to," respectively, and which markers can be mounted on the bar in the center to show a relationship of weight elements on the bar. These markers, and a central portion of the bar could be in the form of cooperating magnetic elements so the markers will be held on the bar in the proper place. Marks 74 on the markers are aligned with the center index mark 59 when the markers are properly located.

The magnetic elements could take the form of a permanent magnet 76 in the bar and the markers would then be of magnetic material, steel for example.

Turning now to the use of the device for demonstrating arithmetical principles, it will be seen that simple principles of levers and simple multiplication and addition and the like can be demonstrated by the use of the bar.

FIG. 2 shows how two units of weight at a distance of two length center plus a one weight unit at a distance of 1½ length units can be brought into balance with a 1 unit of weight at a distance of 3 units of length plus ¾ units of weight at a distance of 2 units of length by the addition of 1 unit of weight at a distance of 1 length unit. Thus, $2 \times 2 + 1 \times 1½ = 1 \times 3 + ¾ \times 2 + 1 \times 1$.

In addition to the several possibilities of the device as a game, it can serve as a teaching device for demonstrating such fundamental mathematical principles as the commutative and associative laws of addition and subtraction and multiplication; the properties of simple equations, equalities and inequalities and the properties of at least second class levers.

In FIG. 4, bar 90 has fulcrum 92 with spaced parallel edge portion 94. Round pins 96 and square pins 98 project from the top of the board with the distance from each pin 96 to the adjacent pin 98 being the same as the distance from center line 100 to each pin 96.

FIG. 5 shows a ring-like weight element 102 having a round hole. This weight element can be received only on a pin 96. FIG. 5 also shows a weight element 104 with a square hole that will only receive a pin 98.

Weight element 106 in FIG. 5 has a hole that will receive either a pin 96 or a pin 98. In every case the pin will locate the weight element placed thereon so the center of gravity of the weight element is located the proper distance from center line 100.

FIG. 6 shows a still further possibility within the purview of the present invention. In FIG. 6 which is a plan view of one end of a balance bar 110, there is a pin 112 which is triangular, a pin 114 which is square, and a pin 116 which is hexagonal. The points of the pins are all the same radial distance from the center of their respective pins.

FIG. 6 shows also, a ring 118 with a triangular hole, a ring 120 with a square hole, a ring 122 with a hexagonal hole, and a ring 124 with a 12 sided hole.

Since the points on the pins are all the same radial distance from the center of the pins, ring 124 will fit all pins, ring 122 will fit either hexagonal pin 116 or triangular pin 112, while rings 120 and 118 will fit only their respective pins 114 and 112.

Many other combinations of pin shapes, colors and the like are possible and the modification described will, therefore, be understood merely to be exemplary.

Wood or plastics are among the materials that could be used in the manufacture of a device according to the present invention.

It will be understood that this invention is susceptible to modification in order to adapt it to different usages and conditions; and accordingly, it is desired to comprehend such modifications within this invention as may fall within the scope of the appended claims.

What is claimed is:

1. A device adapted for use as a game or for teaching and comprising; a bar-like member, a fulcrum portion on the bottom of said member in the central plane of said bar-like member which is perpendicular to the length of the bar-like member, and which contains the center of gravity of the bar-like member, said fulcrum member having a bearing surface on the end remote from said bar-like member which includes edges located a short distance from said plane on both sides of the plane and parallel to said plane, said fulcrum portion being adapted to support said bar-like member in a horizontal position on a horizontal surface when the bar-like member is balanced within predetermined limits, a plurality of weight elements, receiver means on the top of said bar-like member located predetermined distances on opposite sides of said plane for receiving said weight elements, a single one of the smallest of said weight elements located on the one of the said receiver means closest to said plane being sufficient to unbalance said bar-like member and cause tilting thereof about one of said edges of said fulcrum portion, said receiver means being in the form of pins and said weight elements are in the form of ring means closely but freely receivable on said pins, each of said pins being at a respective distance from said central plane are a respective color and said weight elements include at least one of each said color.

2. A device according to claim 1 which includes at least one weight element of a color different from said respective colors.

3. A device according to claim 1 in which the pins on each side of said central plane are spaced from the central plane respective whole multiples of a selected unit distance.

4. A device according to claim 3 in which said ring means include complete rings and predetermined simple fractional parts of rings.

5. A device according to claim 4 in which said bar-like member includes index marks on the top parallel to said plane and in the planes of the center lines of said pins, and at least said fractional parts of rings each having a mark thereon which registers with the index mark of a respective pin when a fractional part of a ring is disposed against the pin with the center of gravity of the said fractional part of a ring disposed directly above said index mark.

6. A device according to claim 5 in which indicia are applied to said index marks which show the distance of the respective index marks from said central plane.

7. A game comprising:
- a bar-like member having a fulcrum portion and a center of gravity;
- a plurality of receiver means symmetrically and uniformly disposed on said bar member;
- a central one of said receiver means, said center of gravity, and said fulcrum portion being substantially collinear;
- a plurality of equal weight elements, each of said plurality of receiver means adapted to receive at least one weight element; and
- means associated with each weight element and with each receiver means for determining whether a given weight element may be received by a given receiver means.

8. The game of claim 7 adapted to be played as a balanced sum game.

9. The game of claim 7 wherein said weights are not all of the same color;
said means for determining comprising indicia associated with each of certain receiver means indicating that a given color of weight may be received by that receiving means.

10. The game of claim 9 wherein one of said weights is of a color indicating it may be received by any of said receiving means.

11. The game of claim 7 in which said receiver means are in the form of pins and said weight elements are in the form of ring means, said pins having respectively different cross sectional shapes, and said ring means comprising at least one ring having a hole the same shape as each pin and of a size closely and slidably to fit the respective pin.

12. The game of claim 7 wherein said fulcrum portion is adapted to allow said bar member to assume any of three states of stable equilibrium.

References Cited
UNITED STATES PATENTS

| | | | |
|---|---|---|---|
| 2,564,976 | 8/1951 | Hooper | 35—31(4) |
| 3,188,089 | 6/1965 | Odell et al | 273—1X |
| 3,212,202 | 10/1965 | Heinichen | 35—31 |

ANTON O. OECHSLE, Primary Examiner

P. E. SHAPIRO, Assistant Examiner

U.S. Cl. X.R.

35—19, 31; 177—197, 250; 273—153